United States Patent
Nandy et al.

(10) Patent No.: US 9,478,234 B1
(45) Date of Patent: Oct. 25, 2016

(54) MICROPHONE APPARATUS AND METHOD WITH CATCH-UP BUFFER

(71) Applicant: Knowles Electronics, LLC, Itasca, IL (US)

(72) Inventors: Dibyendu Nandy, Naperville, IL (US); Yang Li, Elk Grove Village, IL (US); Ramanujapuram Raghuvir, Oak Brook, IL (US); Robert A. Popper, Lemont, IL (US); Andrzej Pawlowski, Virum (DK); Kim Spetzler Berthelsen, Koego (DK); Henrik Thomsen, Holte (DK); Niel D. Warren, Soquel, CA (US); David P. Rossum, Santa Cruz, CA (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 14/797,310

(22) Filed: Jul. 13, 2015

(51) Int. Cl.
*G06F 17/00* (2006.01)
*G10L 25/78* (2013.01)
*G10L 15/30* (2013.01)
*H04H 60/04* (2008.01)
*H04R 3/00* (2006.01)

(52) U.S. Cl.
CPC .............. *G10L 25/78* (2013.01); *G10L 15/30* (2013.01); *H04H 60/04* (2013.01); *H04R 3/00* (2013.01)

(58) Field of Classification Search
CPC ......... G06F 1/32; G10L 25/48; G10L 25/78; H04R 2499/11; H04R 3/00
See application file for complete search history.

(56) References Cited

U.S. PATENT DOCUMENTS

| | | | |
|---|---|---|---|
| 4,052,568 | A | 10/1977 | Jankowski |
| 5,577,164 | A | 11/1996 | Kaneko et al. |
| 5,598,447 | A | 1/1997 | Usui |
| 5,675,808 | A | 10/1997 | Gulick et al. |

(Continued)

FOREIGN PATENT DOCUMENTS

| | | |
|---|---|---|
| JP | 2001-236095 | 8/2001 |
| WO | WO-2009/130591 A1 | 10/2009 |
| WO | WO-2011/106065 | 9/2011 |
| WO | WO-2011/140096 A1 | 11/2011 |
| WO | WO-2013/049358 | 4/2013 |
| WO | WO-2013/085499 | 6/2013 |

OTHER PUBLICATIONS

International Search Report and Written Opinion for PCT/US2014/038790, dated Sep. 24, 2014 (9 pages).
International Search Report and Written Opinion for PCT/EP2014/064324, dated Feb. 12, 2015 (13 pages).
"MEMS technologies: Microphone," 3 pages (Jun. 20, 2013), accessed from: http://www.eeherald.com/section/design-guide/mems-microphone.html.

(Continued)

*Primary Examiner* — Andrew C Flanders
(74) *Attorney, Agent, or Firm* — Foley & Lardner LLP

(57) ABSTRACT

At a microphone, voice activity is detected in a data stream while simultaneously buffering audio data from the data stream to create buffered data. A signal is sent to a host indicating the positive detection of voice activity in the data stream. When an external clock signal is received from the host, the internal operation of the microphone is synchronized with the external clock signal. Buffered data stream is selectively sent through a first path, the first path including a buffer having a buffer delay time representing the time the first data stream takes to move through the buffer. The data stream is continuously sent through a second path as a real-time data stream, the second path not including the buffer, the real-time data stream beginning with the extended buffer data at a given instant in time. The buffered data stream and the real-time data stream are multiplexed onto a single data line and transmitting the multiplexed data stream to the host.

14 Claims, 12 Drawing Sheets

(56) References Cited

U.S. PATENT DOCUMENTS

| | | |
|---|---|---|
| 5,822,598 A | 10/1998 | Lam |
| 5,983,186 A | 11/1999 | Miyazawa et al. |
| 6,049,565 A | 4/2000 | Paradine et al. |
| 6,057,791 A | 5/2000 | Knapp |
| 6,070,140 A | 5/2000 | Tran |
| 6,154,721 A | 11/2000 | Sonnic |
| 6,249,757 B1 | 6/2001 | Cason |
| 6,282,268 B1 | 8/2001 | Hughes et al. |
| 6,324,514 B2 | 11/2001 | Matulich et al. |
| 6,397,186 B1 | 5/2002 | Bush et al. |
| 6,453,020 B1 | 9/2002 | Hughes et al. |
| 6,564,330 B1 | 5/2003 | Martinez et al. |
| 6,591,234 B1 | 7/2003 | Chandran et al. |
| 6,640,208 B1 | 10/2003 | Zhang et al. |
| 6,756,700 B2 | 6/2004 | Zeng |
| 7,190,038 B2 | 3/2007 | Dehe et al. |
| 7,415,416 B2 | 8/2008 | Rees |
| 7,473,572 B2 | 1/2009 | Dehe et al. |
| 7,619,551 B1 | 11/2009 | Wu |
| 7,630,504 B2 | 12/2009 | Poulsen |
| 7,774,202 B2 | 8/2010 | Spengler et al. |
| 7,774,204 B2 | 8/2010 | Mozer et al. |
| 7,781,249 B2 | 8/2010 | Laming et al. |
| 7,795,695 B2 | 9/2010 | Weigold et al. |
| 7,825,484 B2 | 11/2010 | Martin et al. |
| 7,829,961 B2 | 11/2010 | Hsiao |
| 7,856,283 B2 | 12/2010 | Burk et al. |
| 7,856,804 B2 | 12/2010 | Laming et al. |
| 7,903,831 B2 | 3/2011 | Song |
| 7,936,293 B2 | 5/2011 | Hamashita |
| 7,941,313 B2 | 5/2011 | Garudadri et al. |
| 7,957,972 B2 | 6/2011 | Huang et al. |
| 7,994,947 B1 | 8/2011 | Ledzius |
| 8,171,322 B2 | 5/2012 | Fiennes et al. |
| 8,208,621 B1 | 6/2012 | Hsu |
| 8,275,148 B2 | 9/2012 | Li et al. |
| 8,331,581 B2 | 12/2012 | Pennock |
| 8,666,751 B2 | 3/2014 | Murthi et al. |
| 8,687,823 B2 | 4/2014 | Loeppert et al. |
| 8,731,210 B2 | 5/2014 | Cheng et al. |
| 8,804,974 B1 | 8/2014 | Melanson |
| 8,831,246 B2 | 9/2014 | Josefsson |
| 8,972,252 B2 | 3/2015 | Hung et al. |
| 8,996,381 B2 | 3/2015 | Mozer et al. |
| 9,020,819 B2 | 4/2015 | Saitoh et al. |
| 9,043,211 B2 | 5/2015 | Haiut et al. |
| 9,059,630 B2 | 6/2015 | Gueorguiev |
| 9,073,747 B2 | 7/2015 | Ye |
| 9,076,447 B2 | 7/2015 | Nandy et al. |
| 9,111,548 B2 | 8/2015 | Nandy et al. |
| 9,112,984 B2 | 8/2015 | Sejnoha et al. |
| 9,113,263 B2 | 8/2015 | Furst et al. |
| 9,142,215 B2 | 9/2015 | Rosner et al. |
| 9,147,397 B2 | 9/2015 | Thomsen et al. |
| 9,161,112 B2 | 10/2015 | Ye |
| 2002/0054588 A1 | 5/2002 | Mehta et al. |
| 2002/0116186 A1 | 8/2002 | Strauss et al. |
| 2002/0123893 A1 | 9/2002 | Woodward |
| 2002/0184015 A1 | 12/2002 | Li et al. |
| 2003/0004720 A1 | 1/2003 | Garudadri et al. |
| 2003/0061036 A1 | 3/2003 | Garudadri et al. |
| 2003/0091000 A1* | 5/2003 | Chu .................. H04L 12/1827 370/230 |
| 2003/0144844 A1 | 7/2003 | Colmenarez et al. |
| 2004/0022379 A1 | 2/2004 | Klos et al. |
| 2005/0207605 A1 | 9/2005 | Dehe et al. |
| 2006/0074658 A1 | 4/2006 | Chadha |
| 2006/0233389 A1 | 10/2006 | Mao et al. |
| 2006/0247923 A1 | 11/2006 | Chandran et al. |
| 2007/0168908 A1 | 7/2007 | Paolucci et al. |
| 2007/0278501 A1 | 12/2007 | MacPherson et al. |
| 2008/0089536 A1 | 4/2008 | Josefsson |
| 2008/0120098 A1* | 5/2008 | Makinen ................ G10L 19/22 704/222 |
| 2008/0175425 A1 | 7/2008 | Roberts et al. |
| 2008/0201138 A1 | 8/2008 | Visser et al. |
| 2008/0267431 A1 | 10/2008 | Leidl et al. |
| 2008/0279407 A1 | 11/2008 | Pahl |
| 2008/0283942 A1 | 11/2008 | Huang et al. |
| 2009/0001553 A1 | 1/2009 | Pahl et al. |
| 2009/0022172 A1* | 1/2009 | Haberman ....... H04N 21/23424 370/429 |
| 2009/0180655 A1 | 7/2009 | Tien et al. |
| 2010/0046780 A1 | 2/2010 | Song |
| 2010/0052082 A1 | 3/2010 | Lee et al. |
| 2010/0057474 A1 | 3/2010 | Kong |
| 2010/0128894 A1 | 5/2010 | Petit et al. |
| 2010/0128914 A1 | 5/2010 | Khenkin |
| 2010/0183181 A1 | 7/2010 | Wang |
| 2010/0246877 A1 | 9/2010 | Wang et al. |
| 2010/0290644 A1 | 11/2010 | Wu et al. |
| 2010/0292987 A1 | 11/2010 | Kawaguchi et al. |
| 2010/0322443 A1 | 12/2010 | Wu et al. |
| 2010/0322451 A1 | 12/2010 | Wu et al. |
| 2011/0007907 A1 | 1/2011 | Park et al. |
| 2011/0013787 A1 | 1/2011 | Chang |
| 2011/0029109 A1 | 2/2011 | Thomsen et al. |
| 2011/0075875 A1 | 3/2011 | Wu et al. |
| 2011/0106533 A1 | 5/2011 | Yu |
| 2011/0208520 A1 | 8/2011 | Lee |
| 2011/0280109 A1 | 11/2011 | Raymond |
| 2012/0010890 A1 | 1/2012 | Koverzin |
| 2012/0232896 A1 | 9/2012 | Taleb et al. |
| 2012/0250881 A1 | 10/2012 | Mulligan |
| 2012/0310641 A1 | 12/2012 | Niemisto et al. |
| 2013/0044898 A1 | 2/2013 | Schultz et al. |
| 2013/0058506 A1 | 3/2013 | Boor |
| 2013/0223635 A1 | 8/2013 | Singer et al. |
| 2013/0226324 A1 | 8/2013 | Hannuksela et al. |
| 2013/0246071 A1 | 9/2013 | Lee et al. |
| 2013/0322461 A1 | 12/2013 | Poulsen |
| 2013/0343584 A1 | 12/2013 | Bennett et al. |
| 2014/0122078 A1 | 5/2014 | Joshi et al. |
| 2014/0143545 A1 | 5/2014 | McKeeman et al. |
| 2014/0163978 A1 | 6/2014 | Basye et al. |
| 2014/0177113 A1 | 6/2014 | Gueorguiev et al. |
| 2014/0188467 A1 | 7/2014 | Jing et al. |
| 2014/0197887 A1 | 7/2014 | Hovesten et al. |
| 2014/0244269 A1 | 8/2014 | Tokutake |
| 2014/0249820 A1 | 9/2014 | Hsu et al. |
| 2014/0257813 A1 | 9/2014 | Mortensen |
| 2014/0257821 A1* | 9/2014 | Adams .................... G10L 25/93 704/275 |
| 2014/0274203 A1 | 9/2014 | Ganong et al. |
| 2014/0278435 A1 | 9/2014 | Ganong et al. |
| 2014/0281628 A1 | 9/2014 | Nigam et al. |
| 2014/0343949 A1 | 11/2014 | Huang et al. |
| 2014/0348345 A1 | 11/2014 | Furst et al. |
| 2014/0358552 A1 | 12/2014 | Xu |
| 2015/0039303 A1 | 2/2015 | Lesso et al. |
| 2015/0043755 A1 | 2/2015 | Furst et al. |
| 2015/0046157 A1 | 2/2015 | Wolff et al. |
| 2015/0046162 A1 | 2/2015 | Aley-Raz et al. |
| 2015/0049884 A1 | 2/2015 | Ye |
| 2015/0055803 A1 | 2/2015 | Qutub et al. |
| 2015/0058001 A1 | 2/2015 | Dai et al. |
| 2015/0063594 A1 | 3/2015 | Nielsen et al. |
| 2015/0073780 A1 | 3/2015 | Sharma et al. |
| 2015/0073785 A1 | 3/2015 | Sharma et al. |
| 2015/0088500 A1 | 3/2015 | Conliffe |
| 2015/0106085 A1 | 4/2015 | Lindahl |
| 2015/0110290 A1 | 4/2015 | Furst et al. |
| 2015/0112690 A1 | 4/2015 | Guha et al. |
| 2015/0134331 A1 | 5/2015 | Millet et al. |
| 2015/0154981 A1 | 6/2015 | Barreda et al. |
| 2015/0161989 A1 | 6/2015 | Hsu et al. |
| 2015/0195656 A1 | 7/2015 | Ye |
| 2015/0206527 A1 | 7/2015 | Connolly et al. |
| 2015/0256660 A1 | 9/2015 | Kaller et al. |
| 2015/0256916 A1 | 9/2015 | Volk et al. |
| 2015/0287401 A1 | 10/2015 | Lee et al. |
| 2015/0302865 A1 | 10/2015 | Pilli et al. |

(56) References Cited

U.S. PATENT DOCUMENTS

| | | |
|---|---|---|
| 2015/0304502 A1 | 10/2015 | Pilli et al. |
| 2015/0350760 A1 | 12/2015 | Nandy et al. |
| 2015/0350774 A1 | 12/2015 | Furst et al. |

OTHER PUBLICATIONS

Delta-sigma modulation, Wikipedia (Jul. 4, 2013).
Pulse-density modulation, Wikipedia (May 3, 2013).
Kite, Thomas, "Understanding PDM Digital Audio", Audio Precision, Beaverton, Oregon, 9 pages (2012).
International Search Report and Written Opinion for PCT/US2014/060567 dated Jan. 16, 2015 (12 pages).
International Search Report and Written Opinion for PCT/US2014/062861 dated Jan. 23, 2015 (12 pages).
English-language machine translation of JP 2001-236095, Olympus Optical Co. (Aug. 31, 2001).

* cited by examiner

MICROPHONE APPARATUS AND METHOD WITH CATCH-UP BUFFER

TECHNICAL FIELD

This application relates to acoustic systems, and, more specifically to processing data in these audio systems.

BACKGROUND

Different types of acoustic devices have been used through the years. One type of device is a microphone and one type of microphone is a microelectromechanical system (MEMS) microphone, including a MEMS die having a diaphragm and a back plate. The MEMS die is supported by a substrate and enclosed by a housing (e.g., a cup or cover with walls). A port may extend through the substrate (for a bottom port device) or through the top of the housing (for a top port device). In any case, sound energy traverses the port, moves the diaphragm and creates a changing potential of the back plate, which creates an electrical signal. Microphones are deployed in various types of devices such as personal computers or cellular phones.

Digital microphones now exist that convert the analog data produced by the sensor into digital data. The digital data is utilized by different processing elements in the microphone to perform different sets of functions such as acoustic activity detection. Acoustic activity detection requires time to be performed in a reliable manner. Unfortunately, this time delay in detection incurs latency, which allows real-time data to pile or back-up thereby reducing the efficiency and performance of the system. The latency further requires use of a buffer to store audio data, while the acoustic activity detection is made.

The problems of previous approaches have resulted in some user dissatisfaction with these previous approaches, specially the latency that is incurred and that stays in the audio path impacting user experience in voice recognition tasks.

BRIEF DESCRIPTION OF THE DRAWINGS

For a more complete understanding of the disclosure, reference should be made to the following detailed description and accompanying drawings wherein.

Figure 1:
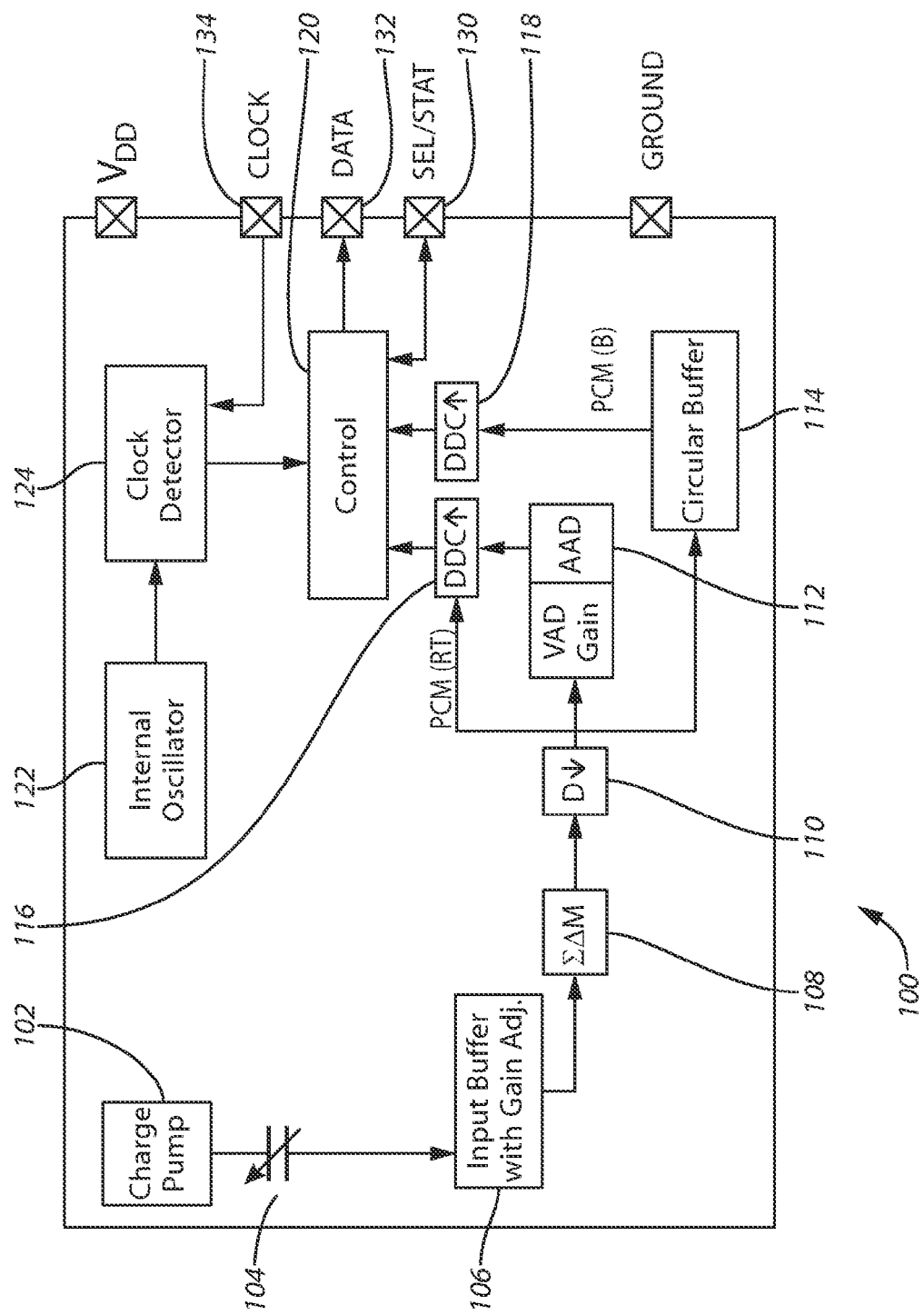
FIG. 1 is a block diagram of a microphone.

Skilled artisans will appreciate that elements in the figures are illustrated for simplicity and clarity. It will be appreciated further that certain actions and/or steps may be described or depicted in a particular order of occurrence while those skilled in the art will understand that such specificity with respect to sequence is not actually required.

It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The present approaches allow a first microphone to be operated in a mode having a real-time data path and a path that includes buffered data. The present approaches utilize a host processing device that enables the buffered audio data of the first microphone to catch up or recover the latency as compared to the real-time or live audio data capture. Among other things, this allows the use of a second microphone where the second microphone does not have a buffer. Consequently, any latency issues associated with the first microphone are traversed.

In many of these embodiments and at a host processing device, buffered pulse density modulation (PDM) data and real-time PDM data that has not been buffered is received from a first microphone. The buffered PDM data and the real-time PDM data have the same data content but are discontinuous with respect to the other when received at the host processing device. The buffered PDM data is processed over a first time interval and the real-time PDM data is processed over a second time interval. The host processing device is operated so that the second time interval is less than the first time interval. The real-time PDM data is stitched to an end of the buffered PDM data. The stitching is effective to time align the buffered PDM data with respect to the real-time PDM data to create an output data stream that is sequentially ordered in time. This allows the latency that is otherwise always present in this class of acoustic activity detection MEMS microphones to be transferred to the host device, where it can be easily recovered by faster than real-time processing.

In other aspects, second real-time data is received from a second microphone, the second microphone not having a buffer. In some examples, the second real-time data is inserted into the output stream after the conclusion of the latency recovery mechanism described herein.

In other examples, the processing of the buffered PDM data comprises determining an existence of a trigger word or phrase in the buffered PDM data. In yet other examples, the buffered PDM data and the real-time PDM data are decimated. In some examples, the buffered PDM data and the real-time PDM data are received in a multiplexed format.

In others of these embodiments, a host processing device includes an interface and a processor. The interface has an input and output, and is configured to receive buffered pulse density modulation (PDM) data and real-time PDM data that has not been buffered from a first microphone at the input. The buffered PDM data and the real-time PDM data have the same data content but having a latency and being discontinuous with respect to the other when received at the host processing device. The processor is coupled to the interface, and the processor is configured to process the buffered PDM data over a first time interval and process the real-time PDM data over a second time interval. The processor is operated so that the second time interval is less than the first time interval. The processor is configured to stitch the real-time PDM data to an end of the buffered PDM data. The stitching is effective to synchronize the buffered PDM data with respect to the real-time PDM data and to create an output data stream at the output.

Referring now to FIG. 1, a low power acoustic activity detection (AAD) microphone 100 is described. The microphone 100 includes a charge pump 102, a transducer 104 (including a back plate and diaphragm), an input buffer 106 (with adjustable gain), a sigma delta modulator 108, a decimator 110, an Acoustic Activity Detection (AAD) module 112, a circular buffer 114, a first up converter 116, a second up converter 118, a control block (processor) 120, an internal oscillator 122, and a clock detector 124.

The microphone 100 provides Voice Activity Detection (VAD) capabilities at ultra-low power. The AAD module 112 (including a (VAD) gain block) detects voice and voice-like activity. The circular buffer 114 receives data in real-time. In one aspect, the buffer may of sufficient size to hold 256 msec of audio. In another aspect, the buffer size may be trimable to sizes other than 256 msec. The charge pump 102 provides charge or energy to the transducer 104, and the transducer 104 converts an acoustic signal into an analog signal, which is stored in the input buffer 106. The sigma delta modulator 108 converts the analog signal into a pulse density modulation (PDM) signal, and the decimator 110 converts the PDM signal into a pulse code modulation (PCM) signal. PCM data has two paths: a first path through the circular buffer 114 to up-converter 118, and a second path for real-time data that flows directly through up-converter 116.

The first up converter 116 and second up converter 118 convert PCM data into PDM data. The control block (processor) 120 determines when transmissions are made to a host. The internal oscillator 122 supplies a clock signal and the clock detector 124 determines whether an external clock has been received from an external host via pin 134.

The AAD module 112 detects acoustic activity in a low power operating mode of the microphone. The sensitivity of this block is partially controlled through the input gain of this block. The VAD gain portion of the AAD module 112 in one aspect has a trimable gain. The AAD module 112 monitors the incoming acoustic signals looking for voice-like signature, without the need for an external clock on clock pin 134 and this operation occurs in the aforementioned low power sensing mode. Upon detection of acoustic activity that meets the trigger requirements, the microphone 100 asserts a SEL/STAT pin 130 to wake up the rest of the system in the signal chain. Further, the microphone 100 provides real-time PDM data on DATA line 132 when a clock is made available on the CLOCK line provided by the system after it wakes up. The buffer 114 stores a previous amount of data (e.g., the previous 256 msec of data or a pre-set trimmed amount which may be different from 256 msec) generated prior to the activity detection. Once a clock signal has been detected on pin 134, the microphone 100 transmits the buffered data to a host via DATA line 132. Data output may start at the same time as the SEL/STAT line 130 indicates detection of voice. Alternatively, data output may start after receiving an external clock via pin 134.

Figure 2:
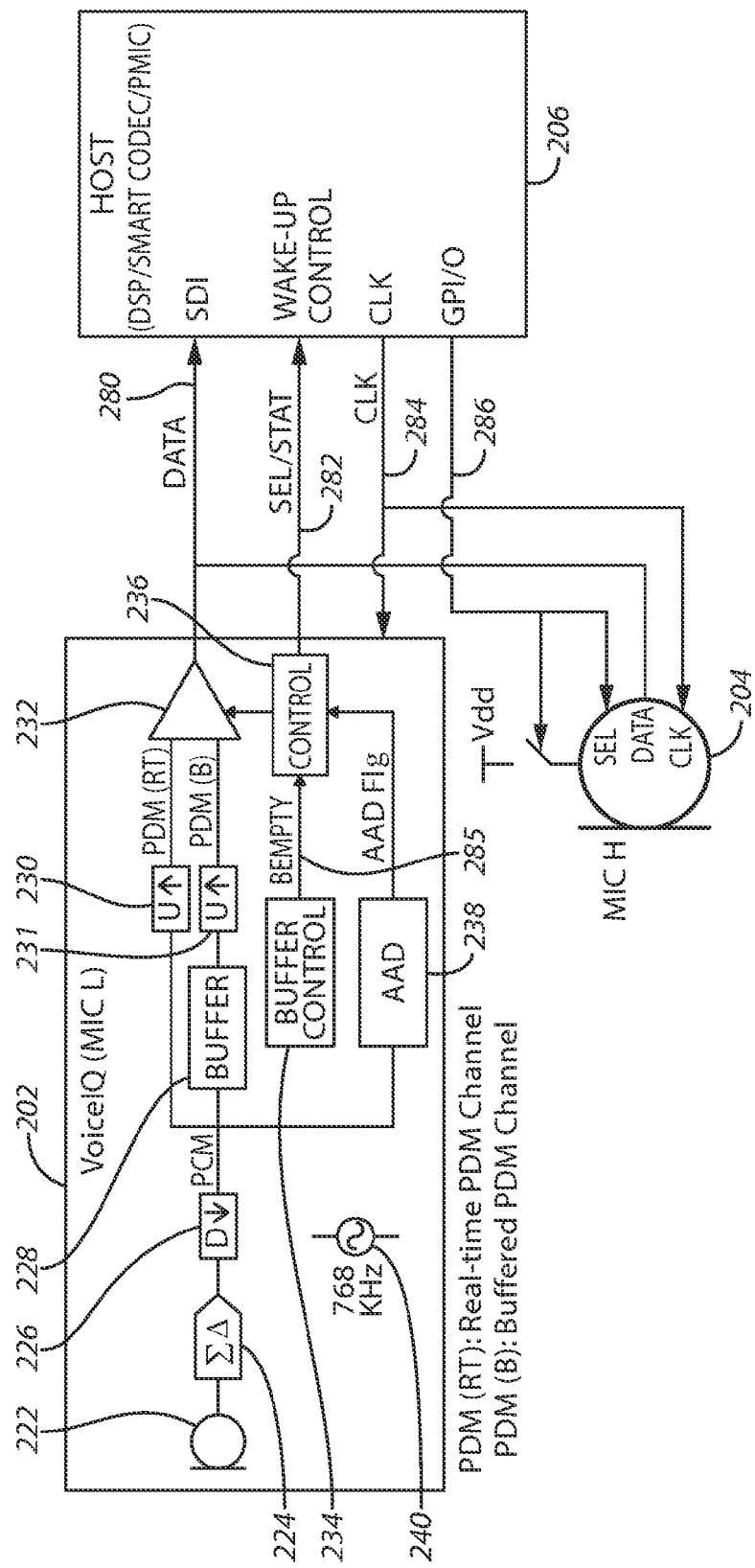
FIG. 2 is a block diagram of a system of two microphones and a host.

Referring now to FIG. 2, another example of a system with a catch-up buffer is described. The system includes a first microphone 202, a second microphone 204, and a host 206.

The first microphone 202 includes a transducer 222 (including, for example, a diaphragm and back plate), a sigma delta converter 224, a decimator 226, a buffer 228, a first up-converter 230, a second up-converter 231, a transmitter 232, a buffer control module 234, a control module 236, an Acoustic Activity Detection (AAD) module 238, and an internal clock 240.

The second microphone 204 includes a transducer, but does not include a buffer. In these regards, the second microphone 204 may be a micro electro mechanical system (MEMS) device that converts sound energy into an electrical signal. The second microphone 204 may include a back plate and a diaphragm. Other examples of microphones are possible.

The host 206 is, in one example, a processing element such as a codec or digital signal processor. The structure of the host 206 is described with respect to FIG. 3. The host 206 receives data streams (that may be multiplexed over a PDM data line 280). The first data stream is from the buffer 228 and the second data stream is un-buffered data. The buffer 228 introduces latency (delay), but is needed because the first microphone 202 needs time for the AAD module 238 to determine whether there is voice (or other acoustic) activity. Additionally, the host processor requires time to wake up from a low power mode and be ready to receive data. The buffer also provides important contextual information to a speech trigger recognition engine to allow it to perform better in noisy conditions. Because of the delay and latency, the two data streams (of the same data content) will be discontinuous and time delayed with respect to each other. The host 206 operates to synchronize the two data streams at its output, and eliminates any discontinuous aspects with respect to each other. In other words, the host guarantees that at some point in time, input data that it is receiving (from one or both of the first or second microphones) is the same data that it is outputting.

The transducer 222 (which may be a micro electro mechanical system (MEMS) device) converts sound energy into an analog electrical signal. The sigma delta converter 224 converts the analog electrical signal into a pulse density modulation (PDM signal). The decimator 226 converts the PDM signal into a pulse code modulation (PCM) signal. The buffer 228 stores the PCM signals. The up-converter 230 converts PCM signals into PDM signals. The transmitter 232 transmits a multiplexed signal (of the first and second data streams) over the data line 280. The transmission is initiated with the receipt of the external clock on line 284. The buffer contents are monitored by the buffer control module 234. When the buffer has transmitted the pre-determined amount of data, for example 256 msec and some additional extension data (by "extension data" it is meant as data beyond the buffer length), the buffer control module 234 sends a buffer empty (bempty) signal 285 to the control module 236, which causes the transmitter 232 to stop multiplexing the contents of the buffer 228. The AAD module 238 detects whether there is voice or other acoustic signals and sends a SEL/STAT signal 282 when acoustic activity is detected. The host 206 responds with a clock signal 284, which is sent to the first and second microphones 202 and 204. The second microphone 204 is also controlled via the GPIO 286 which keeps microphone 204 disabled. The effect of the clock signal 284 is to cause microphone 202 to transmit data. A GPIO 286 is used to control power to the second microphone 204 and to select the second microphone 204. The GPIO 286 is asserted only after stitching is completed at the host. The term "stitching," means combining the real-time data stream at the end of the buffered data stream in the host, such that a continuous data stream is presented to the application.

In one example of the operation of the system of FIG. 2, the first microphone 202 stores or buffers data in the buffer 228 in order for acoustic activity detection to be performed by AAD module 238 on the buffered data. The host 206 is awaken by the SEL/STAT signal 282 and responsively sends the clock signal 284 to the first microphone 202. Receipt of the clock signal allows the first microphone 202 to clock data out over data line 280.

The first microphone 202 sends multiplexed data (of the first and second streams) to the host 206. This multiplexed data will include real-time and buffered data of length X time units (e.g., 256 ms).

The host 206 processes the X units of buffer data until the processing is complete. X units of real-time data is also waiting for processing by the host 206. The host 206 processes the real-time data over a second time period that is much, much less than the first time period. The host 206 may be operated faster to accomplish this function. The host 206 stitches the real-time data to the end of the buffered data. The goal is that the data being input into the host 206 is being output from the host 206 in real-time.

In order to support low power applications that require or prefer to reduce the signal latency due to the buffer 228, a burst mode is provided in the system of FIG. 2. Burst mode provides the capability for faster than real-time data transfer. Burst mode implements two data paths, one for the real-time data and the other for the buffered data, both of which go through the decimation and interpolation functions needed to run the AAD module 238, for example, at 16 kHz/16 bits PCM. In one aspect, the burst mode utilizes two interpolators to ensure that the signal paths for both signals have the same phase response, excluding any coding and decoding associated with the buffering operation.

The burst mode operates as follows. The SEL/STAT line 282 is used for signaling the state of the microphone 202 to the host 206. The microphone 202 is normally in sense mode with no activity on the data line 280 and SEL/STAT line 282, when there is no voice and the microphone AAD module 238 has converged to the ambient noise.

When the AAD module 238 detects acoustic activity and asserts the SEL/STAT line 282, the host 206 enters the wake-up mode. This action wakes up the host 206 with some latency. The host 206 in one aspect provides a 768 kHz signal to the clock line 284.

The reception of the clock signal 284 by the first microphone 202 along with acoustic detection puts the first microphone 202 into burst mode. In one example, the first microphone 202 enters burst mode within 10 clock cycles of receiving the external clock at 768 kHz. The burst mode uses a first PDM channel to send the buffer data and a second PDM channel to send real-time data to the host.

In some aspects, the real-time PDM channel may be the default channel, so that the real-time data is valid and may be latched during the rising edge of the clock. Buffered data is valid and may be latched during the falling edge of the clock. The data transfer rate in burst mode is in one example double the normal data rate at 768 kHz. When in the burst mode and in one example, the first microphone 202 will toggle the SEL/STAT pin 282 at 8 kHz, synchronous to the 768 kHz CLOCK edges. When the buffer 228 is emptied via the burst mode, the SEL/STAT pin 282 is held high so the host 206 is signaled that the first microphone 202 is now caught up with real-time data. The host 206 may also use a count of the toggle to verify the amount of data collected to aid in "stitching" the buffered and real-time data. Slower toggle rates will cause lower overhead on host systems. In one aspect, the use of an 8 kHz toggle rate will allow the time between each transition to be the duration of 1 PCM sample.

The signal processing algorithms for decimation may cause pops or clicks at the stitch point of the real-time and buffered audio. By a "pop" or "click," it is meant that unnatural discontinuities in the audio samples will cause distortions in the output audio signal that resemble a "pop" or "click" sound. Some overlap is expected to be required between the buffered and real-time data to eliminate these pops or clicks. The buffered data will be extended beyond the 256 msec or the specific trimmed size to provide this overlap. During the extended buffer state, the SEL/STAT line 282 is held high. The end of the extended buffer period is signaled by toggling SEL/STAT pin 282 at 16 kHz to allow distinction from the burst mode state.

At the end of the extended buffer period or state, the first microphone 202 enters the Real-Time low power mode. When in Real-Time low power mode, the first microphone 202 only uses one of the PDM channels. Data is valid during the rising edge. This permits the use of the second PDM microphone 204 on the PDM port. The second PDM microphone 204 has to be off during the combined time for burst mode output and extended buffer output durations. The SEL/STAT toggle on line 282 may be used as a signal to determine when the second microphone 204 can be powered on. The SEL/STAT pin 282 will keep toggling until the end of detected voice activity. Thus, the activity of the SEL/STAT pin 282, either high or toggling is an indicator of voice activity. If the host 206 uses internal timers available to it, exact grabbing of the extension buffer may not be necessary, but may be self-regulated by the host 206.

Only after the cessation of voice activity and the external clock 284 from the host 206 will the first microphone 202 re-enter sense mode.

Figure 3:
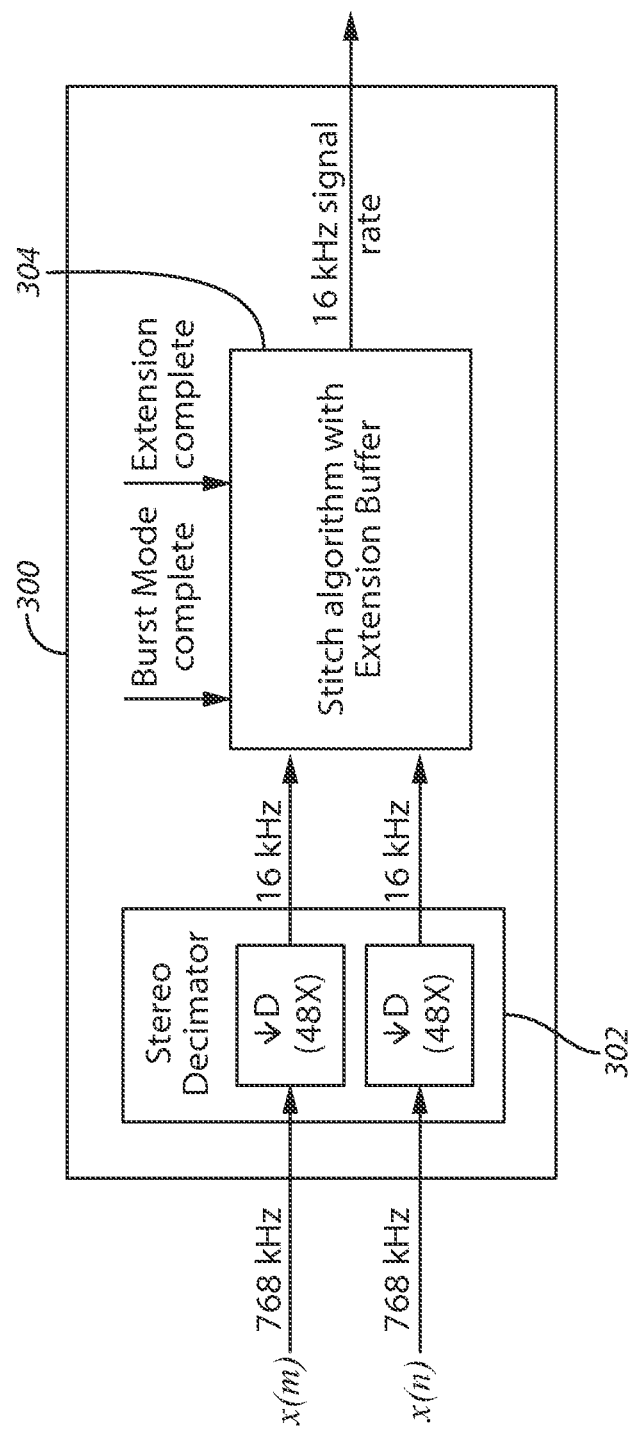
FIG. 3 is a block diagram of a host.

Referring now to FIG. 3, one example of a host 300 (e.g., host 206 from FIG. 2) is described. The host 300 includes a stereo decimator 302 (acting as an interface) and a processor 304. The decimator 302 converts PDM data into PCM data. The processor 304 implements or executes stitching approaches (any combination of hardware and software) that append real-time data to the buffered data. The processor 304 includes a buffer for real-time data.

Data discontinuity exists at the start of a burst when the microphone (e.g., microphone 202) is operated in burst mode. Discontinuity can be represented as x(m)-x(n) and is approximately equal to 256 ms where 256 ms is the buffer length of the first microphone (e.g., microphone 202). A voice trigger algorithm starts recognition on the buffered data, x(m) over a first processing interval, while the real-time data x(n) is saved in a buffer on the host 300 and will be processed by voice trigger algorithm over a second processing interval. Data is stitched by the host 300 (e.g., host 206) after the entire buffer (256 ms) is drained and latency is consequently recovered. Buffer data of the buffer in the first microphone (e.g., buffer 228 in first microphone 202) is extended (e.g., by a length less than 256 ms) to allow the stitch algorithm operated by the processor 304 to synchronize x(m) and x(n) and eliminate signal discontinuity.

After data discontinuity is resolved and synchronization is achieved, real-time data from the first and second microphones (e.g., microphones 202 and 204) can be multiplexed on the incoming data line and output in real-time. This may correspond to a low-power real-time mode.

Figure 4A:
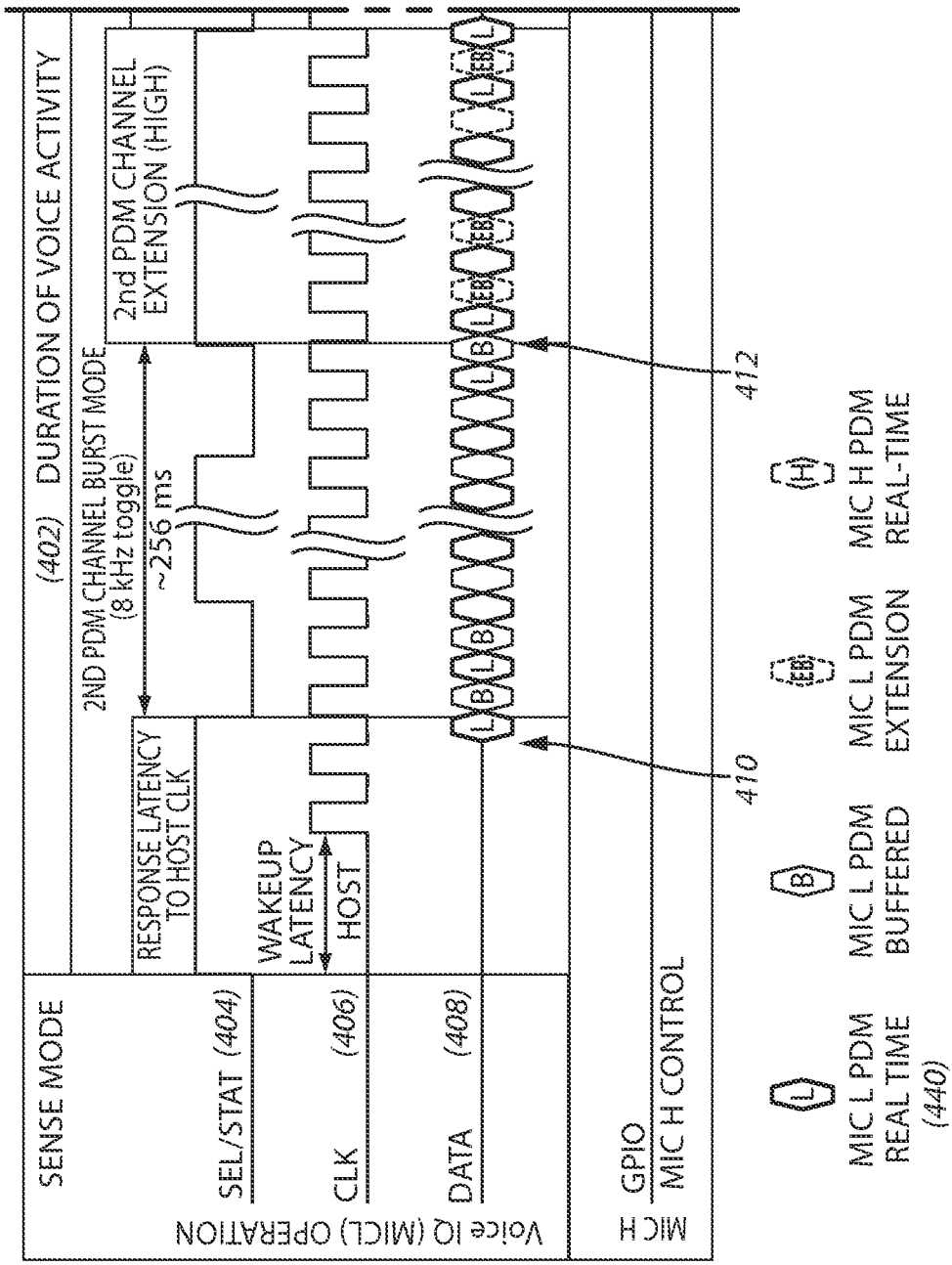
FIGS. 4A and 4B illustrate a timing diagram of the operation of the systems described herein according to various embodiments of the present invention.
Figure 4B:
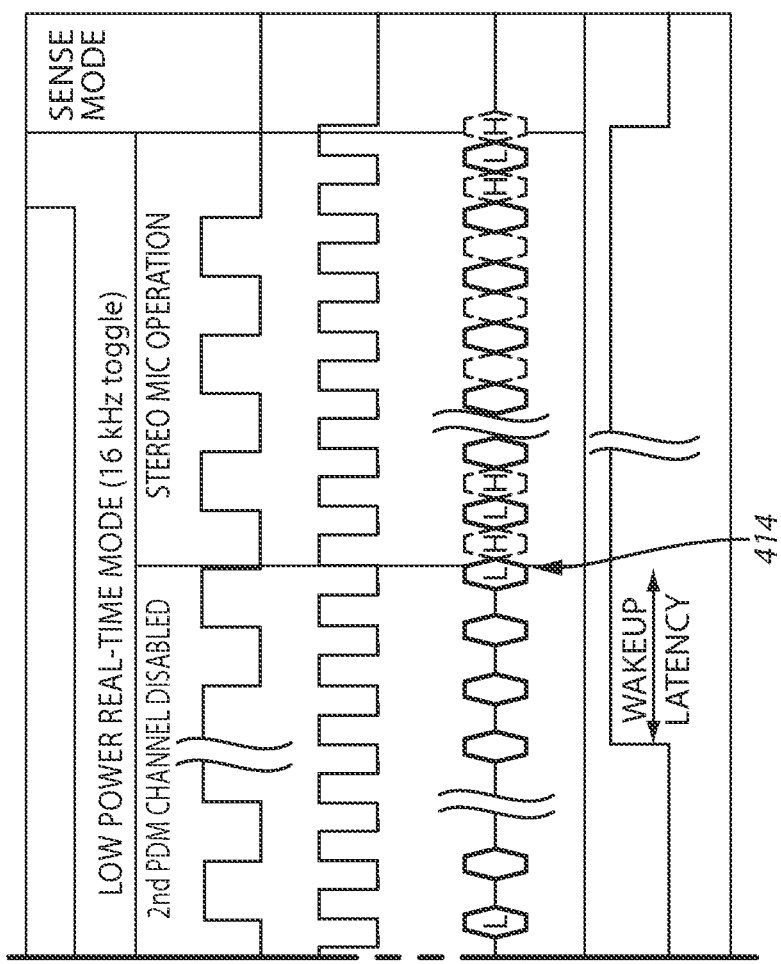

Referring now to FIG. 4, a timeline showing the operation of the approaches described herein is described. The time line shows the occurrence of voice activity 402. It will be appreciated that this timing diagram illustrates the operation of the systems described with respect to FIGS. 1-3.

Voice is detected causing the SEL/STAT line 404 to go high. SEL/STAT stays high until the clock (e.g., 768 kHz clock) is received from the host. The host sends clock signal 406 back to the first microphone. The first microphone detects the clock signal and sends data out on data line 408 at time 410. SEL/STAT then toggles at a suitably chosen signaling frequency. An example frequency that may be used is 8 kHz. On the rising edge of the clock, real-time PDM data 440 is received over the data line. On the falling edge, buffer PDM data is received over the data line from the first microphone. This is the burst mode.

Then at time 412, extension mode is entered. On the rising edge of the clock real-time PDM data is received over the data line and on the falling edge of the clock extension buffer data is received over the data line. This allows the host to stich the real-time data to the buffer data. The extension period may last a pre-determined time. In one example, this extension period is less than 128 ms and in other examples, this extension period could be 32 msec, 16 msec or 8 msec or another suitable time interval. SEL/STAT toggles at a suitably chosen signaling frequency different from the burst mode signaling frequency until AAD goes inactive. An example frequency could be 16 kHz. At this point, real-time PDM data alone is being received over the data line. Optionally, at time 414, a second microphone (without a buffer) may be powered on the falling edge of the clock after the buffer extension period. On the rising edge of the clock real-time PDM data from first microphone is received over the data line and on the falling edge of the clock real-time PDM data from second microphone is received over the data line.

Figure 5:
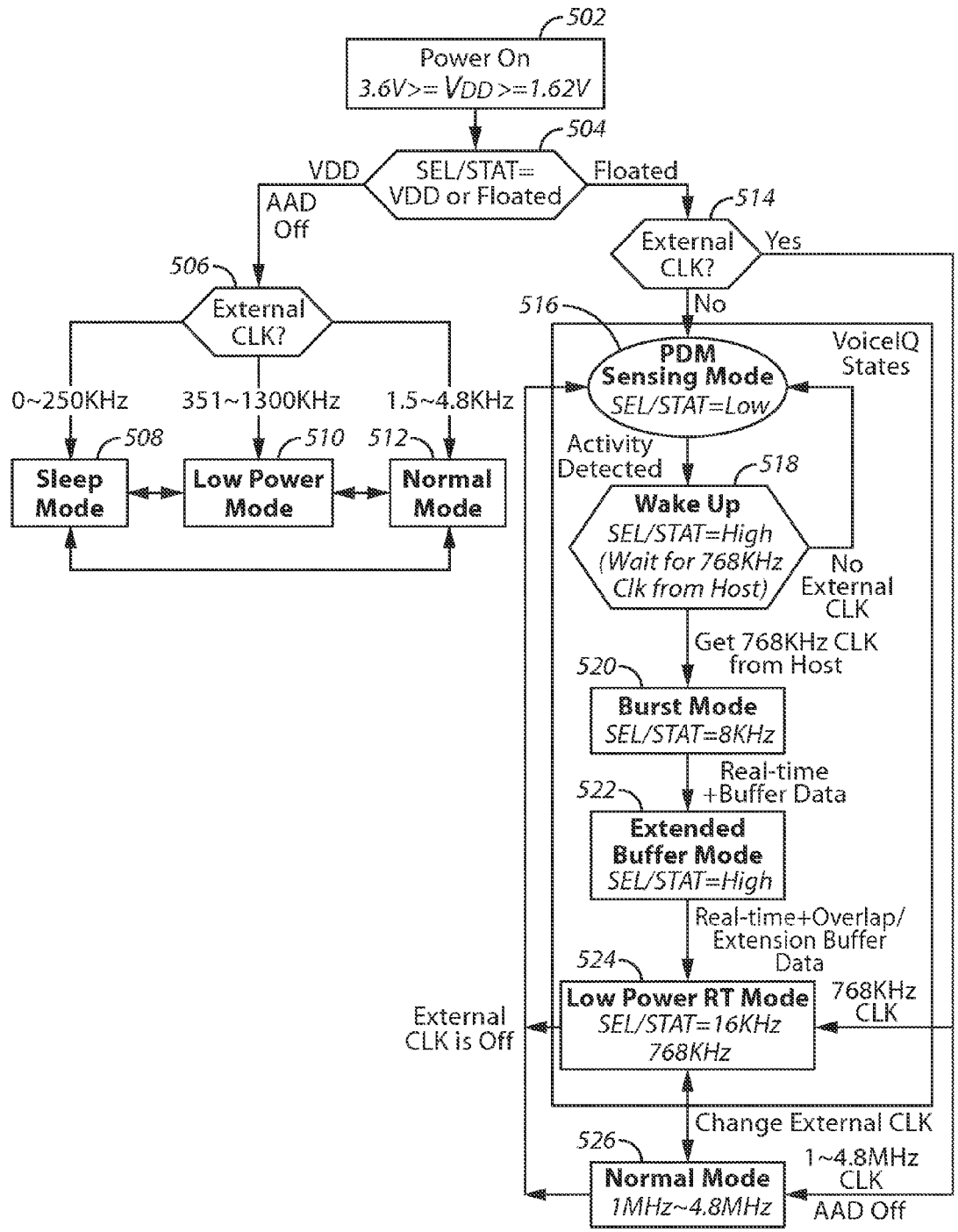
FIG. 5 is a flow chart of the operation of the systems described herein.

Referring now to FIG. 5, one example of the state transitions is described. It will be appreciated that this flow chart illustrates the operation of the systems described with respect to FIGS. 1-4.

At step 502, the system is powered ON. At step 504, determine if the SEL/STAT line is VDD or floated.

If at step 504 VDD and acoustic activity detection (AAD) is off, then at step 506 the external clock rate is determined. In one aspect of the invention, if the clock rate is 0-315 kHz, at step 508, the microphone goes to sleep mode. If the clock rate is between 315 and 1400 kHz, at step 510, the microphone is operated in low power mode. If the clock rate is between 1.4 to 4.8 MHz, the microphone goes to normal operating mode at step 512.

If at step 504 the SEL/STAT is floated, then at step 514 it is determined if there is an external clock being received at the microphone. If the external clock is detected to be 1 to 4.8 MHz, execution continues with step 526 where the microphone is operated in normal operating mode. If the external clock is at 768 kHz, execution continues with step 524 at a low power real-time mode. If the answer at step 514 is negative, at step 516 the microphone enters PDM sensing mode. At step 518, wake up is performed. If no external clock is being received at the microphone, execution continues with step 516. If external clock is being received at the microphone, burst mode is entered at step 520. At step 520, burst mode is executed as has been described herein. If at step 524 or step 526, the external clock is stopped, then the execution reverts to block 516 and the microphone enters the PDM sensing mode.

Figure 6:
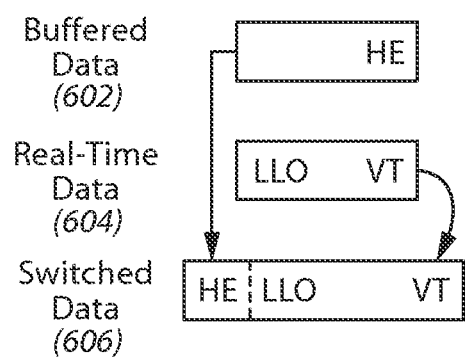
FIG. 6 is a diagram showing one example of stitching.

Referring now to FIG. 6, one example of stitching data from the buffer and real-time data is described. It will be appreciated that this example shows how data may be stitched together in the system of FIGS. 1-5.

A buffer (e.g., the buffer 228 in the first microphone of FIG. 2) includes buffered data 602. An audio phrase is received. "He" which (in this example) is the first part of the phrase "Hello VT." Real-time data 604 also is received and this may be "llo VT" from the last part of the phrase "Hello VT." The stitching algorithm in the host (e.g., host 206) receives these two data streams and stitches "llo VT" to the end of the buffered data to make stitched data 606 "Hello VT." The processing of the buffer data must proceed at a real-time rate as it is received at a real-time rate with the latency determined by the buffer size in the microphone. The processing of the real-time data may be made much faster than real-time, because of the accumulated data in the host after the stitching process is completed. Thus, the stitched continuous data stream present at the output of the host recovers the latency and catches up to the live signal with significantly reduced latency. The buffered data 602 and the real-time data 604 are now ordered sequentially with each other and the host can process the data received from one or more microphones in real-time without needing to consider synchronization issues between the first and the second microphone.

Figure 7:
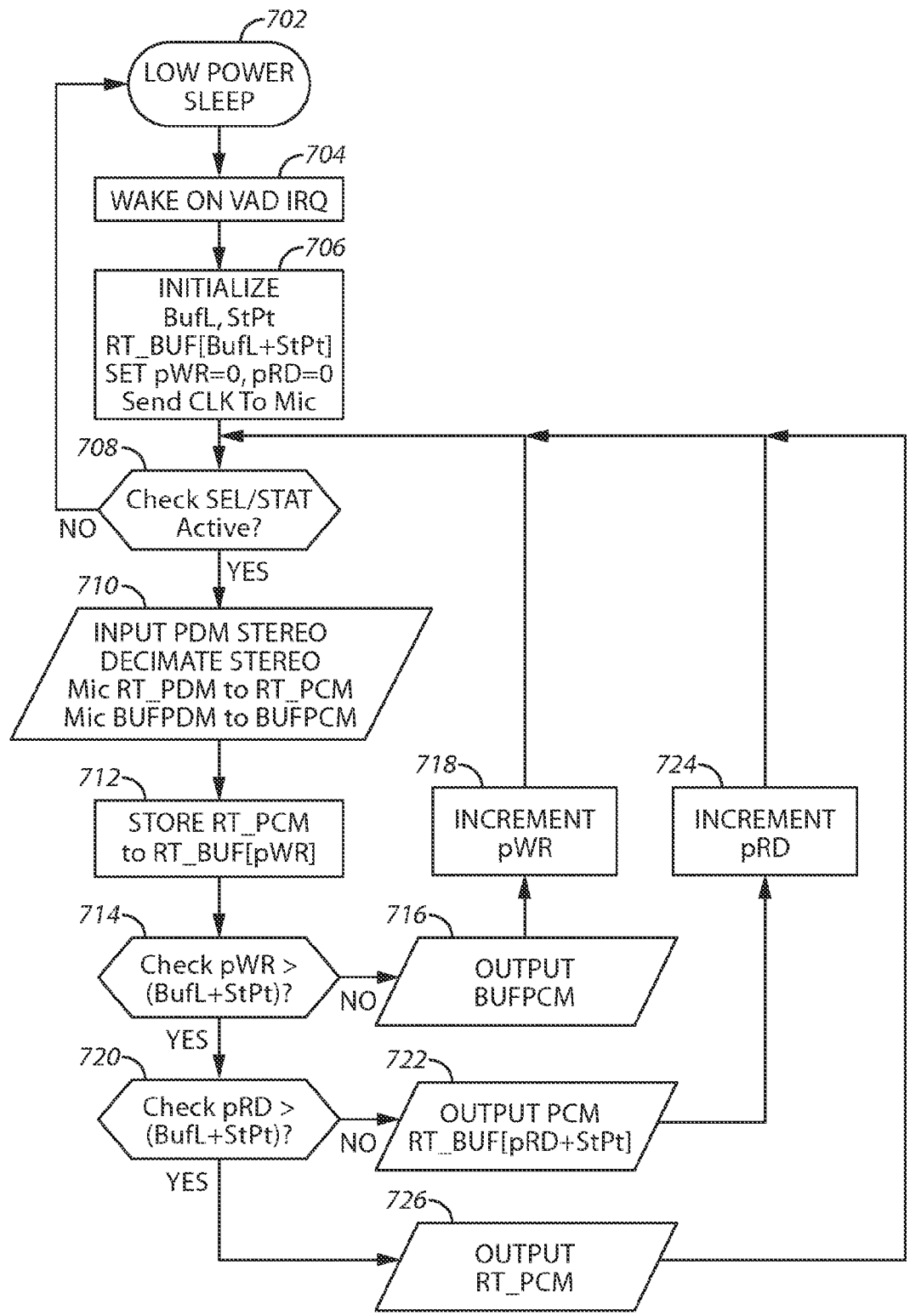
FIG. 7 is a flow chart showing a stitching approach.
Figure 8:
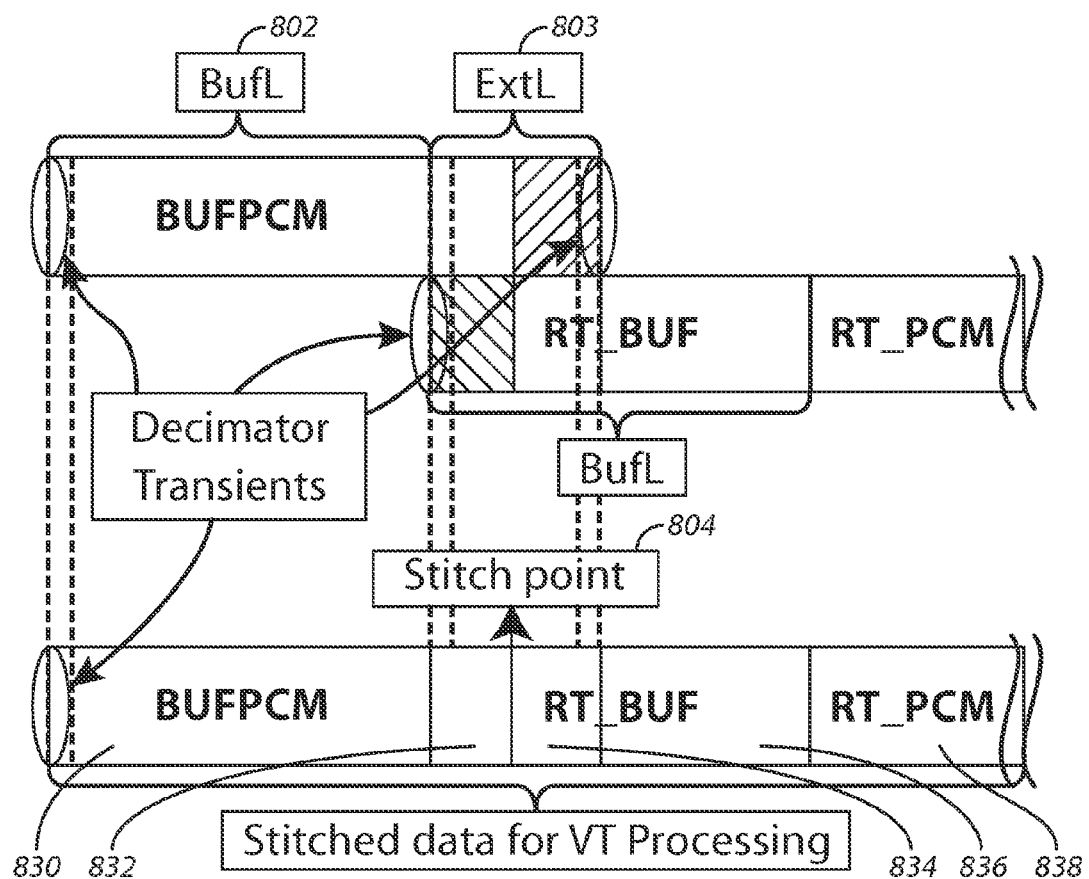
FIG. 8 is a time line and data diagram showing the stitching approach of FIG. 7.

Referring now to FIG. 7 and FIG. 8, one example of a stitching approach is described. The discussion with respect to FIG. 7 and FIG. 8 assumes a microphone and host device, for example, as described previously above.

Transients occur whenever PDM data is fed into a decimation filter or when it is stopped. In some aspects, when buffered data is followed by the real-time data, the transients will occur in the middle of the combined audio streams. Using an extended buffer of length greater than the end transient of the buffered audio and the start transient of the real-time audio allows the skipping of these time intervals by calculation of the decimation filter characteristics. One stitching approach provides an extended buffer and skips these transients. Thus, first the buffered and real-time signal must be time aligned at the host. This is possible because both streams start simultaneously only after the host clock is received.

The lengths of the buffer and the extended buffer are pre-determined and may be based upon various factors. 256 ms and 16 ms are examples of lengths for the buffer and extended buffer, respectively.

The output data is taken from the buffered audio until it is past the point where the start transient of the real-time audio has damped out. The output data is then switched to the corresponding real-time stream, so that the transient at the end of the extended buffer data may be skipped. This audio stream does not have any transient in the middle of the stream with this stitching strategy.

At step 702, the host is asleep. At step 704, the microphone wakes up the host, for instance, as has been described above.

At step 706, various parameters or variables are initialized. More specifically, Bufl is the length of the buffer and this is initialized to a value, for example, in milliseconds (e.g., 256 ms). Bufl is shown as element 802 in FIG. 8.

Stpt is the stich point and is a time value as measured from the end of BUFFERPCM. It is also the same time value when measured from the beginning of the RT_BUF, the real-time buffer on the host. Stpt is represented as element 804 in FIG. 8. Extl is the length of the extension buffer in the microphone and is represented by element 803.

Rt_Buf[BufL+StPt] is an amount of allocation of memory space for real-time data in the host. Real-time data will be stored in a real-time buffer in the host. In one example, the real-time buffer Rt_buf could be set to 256 ms+8 ms if 8 ms is the stitch point. pWR and pRD are write and read pointers and these are initialized to zero.

At step 708, a check is made to determine if line 130 (of FIG. 1) is active. If it is not, return to step 702.

If the line is active at step 710, the host inputs the 2 channels (stereo) of data. The host decimates the data from PDM format to PCM format.

At step 712, store the real-time PCM data in a real-time buffer using the pWR pointer to point to the correct place in the buffer to write the data.

At step 714, a check is made to determine if the pWR pointer has gone past the stitch point. If it has not, at step 716 output the buffered data stream (buffered PCM data) so that it can be further processed. At step 718, the pWR pointer is incremented.

If at step 714, the pWR pointer has gone beyond the stitch point, control continues to step 720. A check is made to see if the pRD flag (used as a position pointer in the real-time data buffer in the host) has reached the stitch point. If it has, output real-time data at step 726. If it has not reached the stitch point, real-time buffer data [pRD+StPt] is output. Then, the pRD pointer is incremented at step 724.

It can be seen in FIG. 8 that the output of this approach will have region 830 (from buffered PCM), region 832 (from extended buffer), region 834 (from extended buffer from RT buffer), region 836 (from RT buffer), and region 838 (not from RT buffer), as the data comes in to the host. It is apparent that the transient regions are avoided because the regions that include the transients are not used (as from a particular buffer).

Figure 9A:
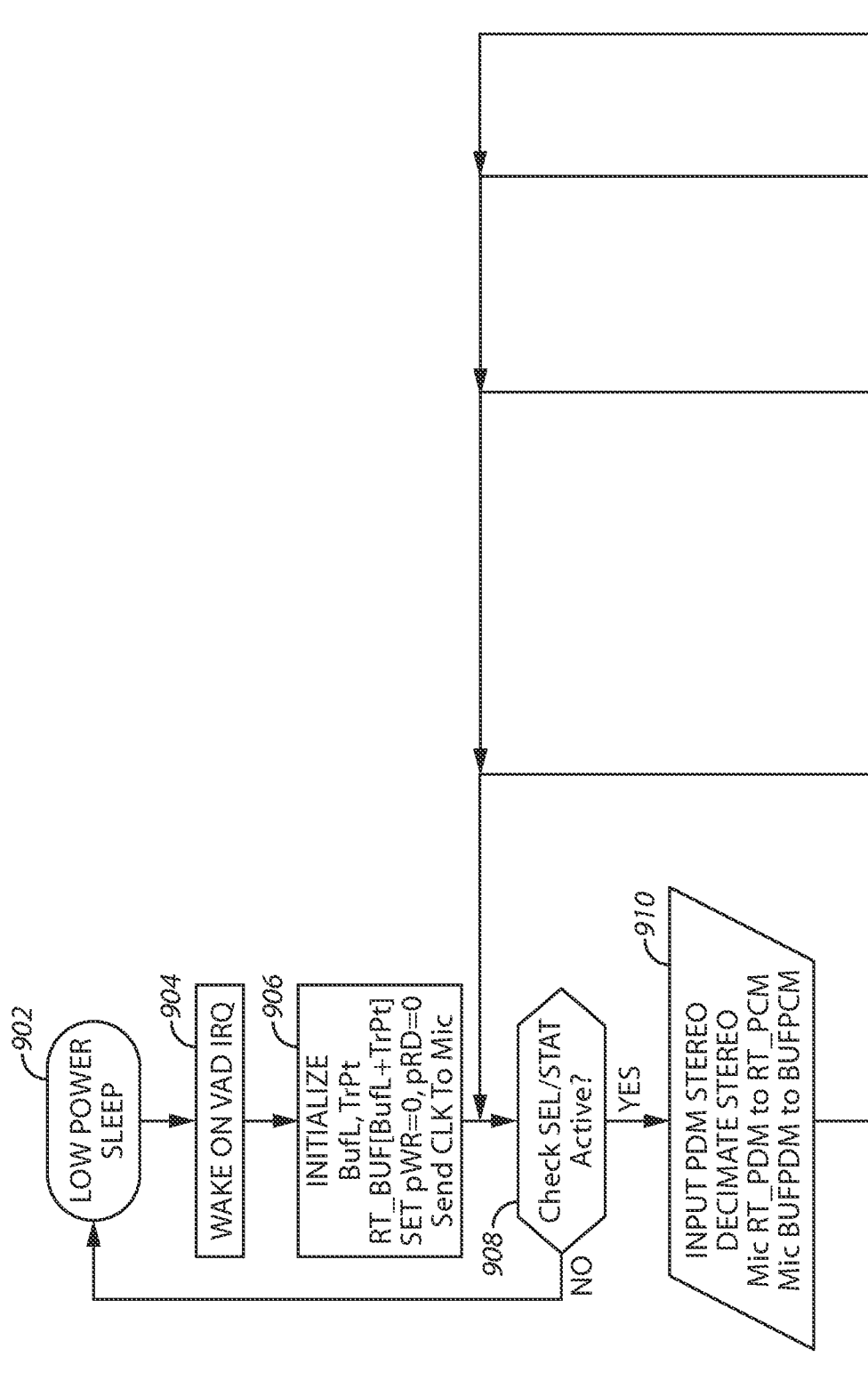
FIG. 9 is a flowchart of another stitching approach.
Figure 9B:
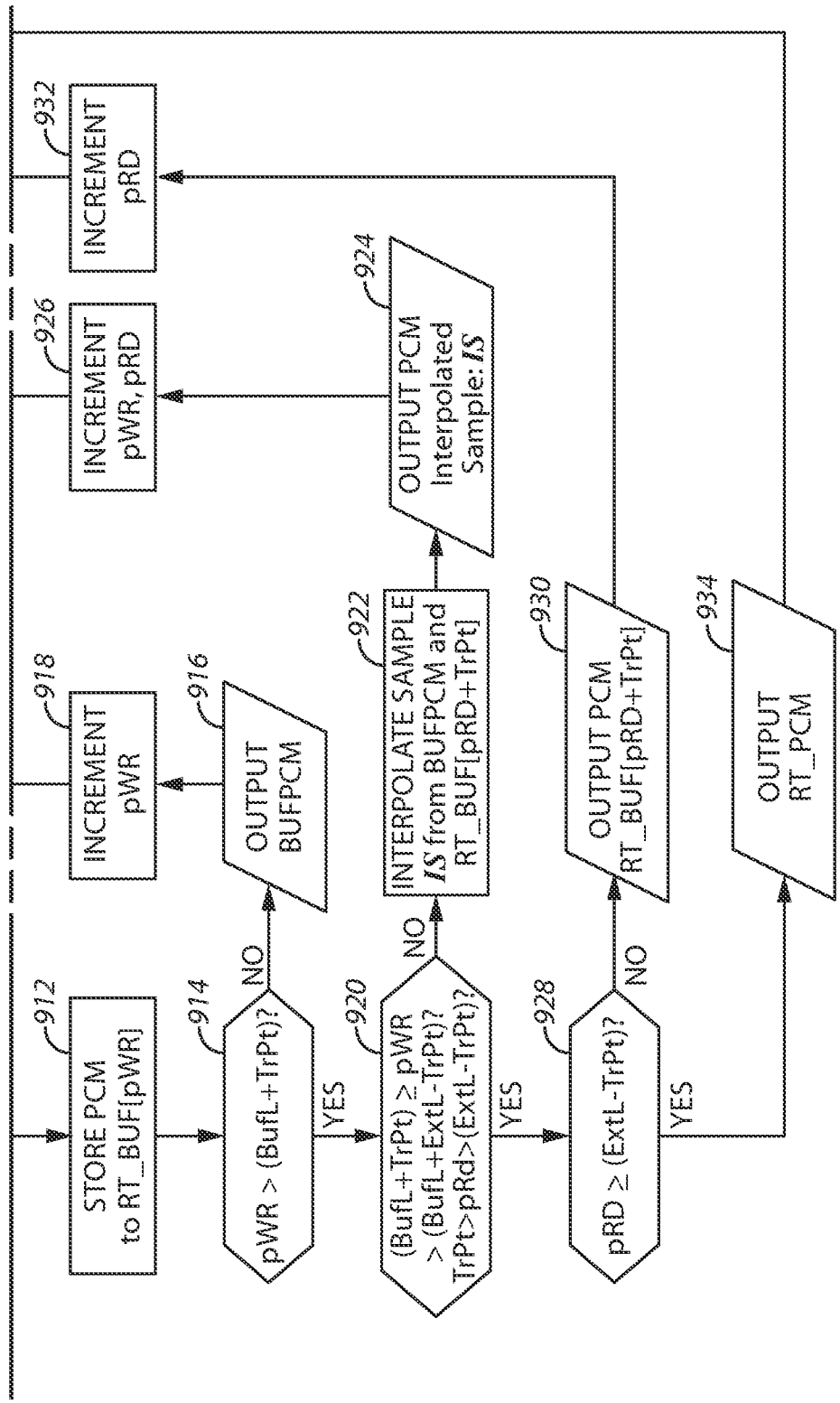
Figure 10:
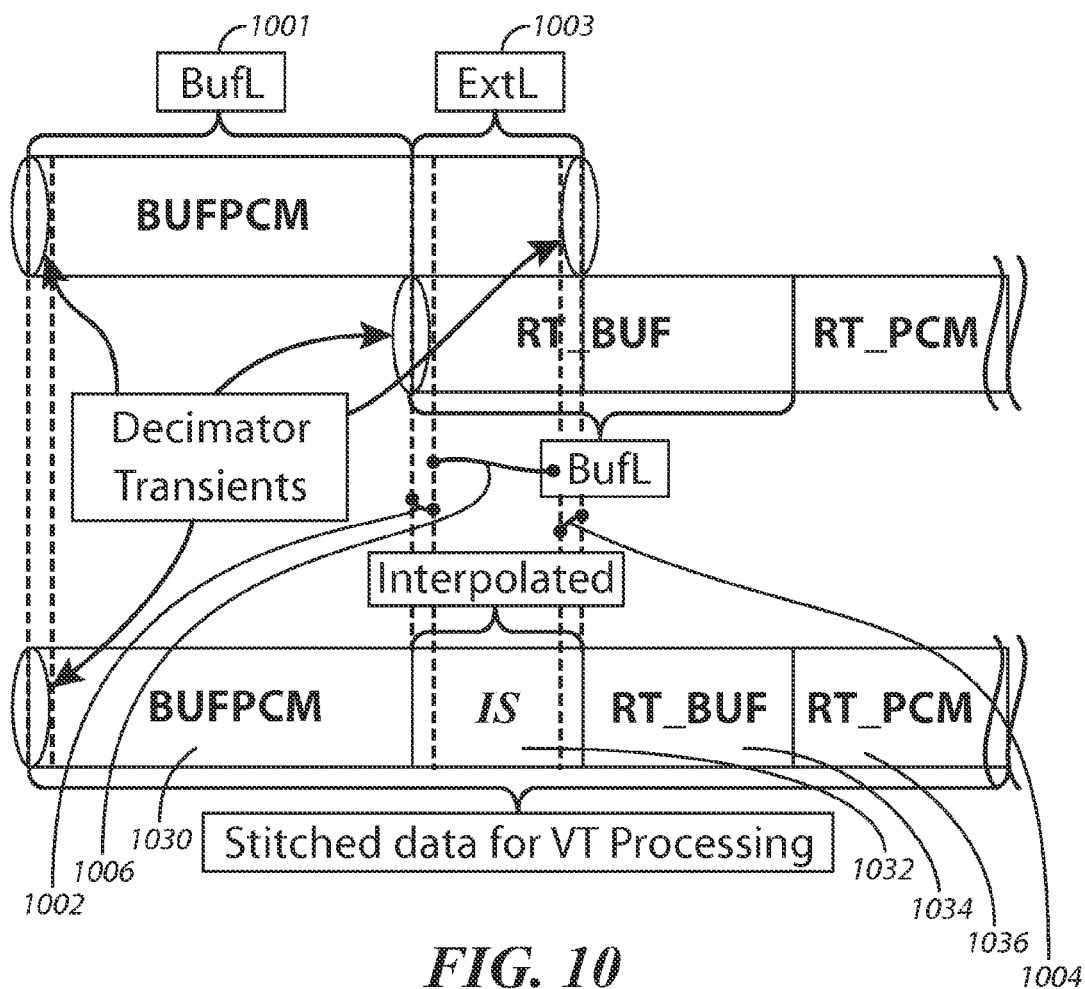
FIG. 10 is a time line and data diagram showing the stitching approach of FIG. 9.

Referring now to FIG. 9 and FIG. 10, another example of a stitching approach is described. The discussion with respect to FIG. 9 and FIG. 10 assumes a microphone and host device, for example, as described previously above. At step 902, the host is asleep. At step 904, the microphone wakes up the host.

At step 906, various parameters or variables are initialized. Bufl is the length of the buffer and this is initialized to a value, for example, in milliseconds. Bufl is shown as element 1001 in FIG. 10. Trpt is the length of decimator transients and these are represented by elements 1002 and 1004 in FIG. 10. Rt_Buf[BufL+TrPt] is a memory allocation for real-time data. Real-time data will be stored in a real-time buffer in the host. This could be 256 ms+8 ms if 8 ms is the stitch point. pWR and pRD are write and read pointers and these are initialized to zero. Extl is the length of the extension buffer in the microphone and is represented by element 1003. IS is the interpolated sample.

At step 908, a check is made by the host to see if line 130 of FIG. 1 is active. If it is not, a return to step 902. At step 910, if it is active, then input the 2 channels (stereo) of data is made. The data is decimated from PDM format to PCM format.

At step 914, the approach is dealing with transient period lengths TrPt 1002 and 1004 lengths, which are assumed to be equal. A check is made to see if pWR is in that area of data.

If the pWR pointer is not in the transient area, at step 916 buffered PCM data is output from the host and at step 918 pWR (which is the pointer used in the buffer to store real-time data in the host) is incremented.

If the approach has reached the transient portion, pWR is somewhere in the middle of zone 1006. At step 920, a check is made to see if pWR is out of that zone 1006. If the answer is negative, then at step 922 interpolate the output data based on weighting. PCM data that is interpolated is output from the host at step 924. pWR and pRD are incremented at step 926.

If the determination made is that the pointers are out of the 1006 zone, then control continues with step 928 where a determination is made as to whether pRD is out of zone 1004. If not out of zone 1004, at step 930 output real-time buffer data RT_BUF[pRD+TrPt]. At step 932, the pointer pRD is incremented.

If the process moves out of zone 1004 (by the determination at step 928), real-time (unbuffered) data is output from the host at step 934.

It can be seen that an interpolated region in the output steam avoids the transients. The output is a buffered PCM data region 1030; interpolated region 1032 (that avoids the transients of regions 1002 and 1004); and real-time buffer region 1034 (from the real-time buffer); and region 1036, which is real-time data that is unbuffered.

It will be understood that different interpolation approaches may be used. If infinite input response (IIR) filters are used in decimation, then the transient persists in perpetuity though with decreasing energy to meet design goals. In some situations, the stitch point still shows some broadband noise at the stitch point when basic stitching is used. In interpolated stitching, an allowance is made for the most significant energy of the transients to die down. Then, the intermediate time interval is used to linearly interpolate between the buffered and real-time data. The interpolation may be performed in one example as follows.

Let the time interval be given by discrete variable n. The start of the buffered audio may be considered n=0. An assumption may be made that the time for the most significant energy of the transients to die down is TrPt. The output for each section is given by the following equations respectively.

For the first segment 1030:

$$op(n)=\text{BUFPCM}(n) \text{ for } 0 < n \leq (\text{Buf}L+TrPt)$$

This equation describes that the output of the host is determined solely based on buffered data.

For the intermediate segment 1032:

$$op(n)=\alpha(n) \times \text{Ext}L(n)+[1-\alpha(n)] \times \text{RTBUF}(n)$$

for $(\text{Buf}L+TrPt) < n$ $\leq (\text{Buf}L+\text{Ext}L$ $-TrPt)$ where $\alpha(n)=n/(\text{Ext}L-2 \times TrPt)$ This equation describes that data in the intermediate segment is linearly interpolated in both data streams.

For the segment 1034:

$$op(n)=\text{RTBUF}(n) \text{ for } (\text{Buf}L+\text{Ext}L-TrPt) < n$$

This equation describes that the output of the host is determined solely based on real-time buffered data. The above approach results in significantly lower transient broadband energy in the segment where the output is in transition from the buffered data stream to the real-time data stream.

In the equation above, op(n) is output at processing cycle n, n is counter of processing cycles, BUFPCM(n) is buffer PCM sample of processing cycle n, RTBUF(n) is real-time PCM sample of processing cycle n, ExtL(n) is extension buffer PCM sample of processing cycle n, and $\alpha(n)$ is time varying weight factor of processing cycle n. In one aspect, $\alpha(n)$ is defined to increase linearly from 0 to 1 with increasing n.

The first and last equations determine when the output is determined solely by the Buffered data and the Real-Time data and the intermediate equation determine how the data in the intermediate segment is linearly interpolated from both data streams.

This results in significantly lower transient broadband energy in the segment where the output transitions from the buffered data stream to the real-time data stream. In other words, buffered data is used more at the beginning of the interpolation, while real-time data is used less. Real-time data is used less at the beginning and more at the end. The degree of use for each may be described as a linear function.

Preferred embodiments are described herein, including the best mode known to the inventors. It should be understood that the illustrated embodiments are exemplary only, and should not be taken as limiting the scope of the appended claims.

What is claimed is:

1. A method comprising:
at a microphone:
detecting voice activity in a data stream while simultaneously buffering the data stream in a buffer;
sending a signal to a host indicating a positive detection of voice activity in the data stream;
in response to receiving an external clock signal from the host, synchronizing internal operations of the microphone with the external clock signal;
sending a buffered data stream through a first path, the first path including the buffer and having a buffer delay time corresponding to a time the buffered data stream takes to move through the buffer;
stopping said sending the buffered data stream after the buffer delay time plus a predetermined buffer extension time, wherein the buffered data stream includes buffered data extending over the buffer delay time and extended buffer data extending over the predetermined buffer extension time;
continuously sending the data stream through a second path as a real-time data stream, wherein the second path does not include the buffer, and wherein the real-time data stream begins with the extended buffer data;
multiplexing the buffered data stream and the real-time data stream to create a multiplexed data stream; and
transmitting the multiplexed data stream to the host via a single data line.

2. The method of claim 1, wherein the multiplexed data stream includes the buffered data and the real-time data during a first operational state, the extended buffered data and the real-time data during a second operational state, and only the real-time data during a third operational state.

3. The method of claim 1, further comprising:
at the host:
receiving the multiplexed data stream;
during a second operational state, comparing the extended buffer data of the buffered data stream to the extended buffer data of the real-time data stream;
based upon the comparing, determining optimal extended buffer data; and
combining the buffered data stream to the real-time data stream to form an output data stream.

4. The method of claim 3,
wherein the extended buffer data in the buffered data stream is received at the host with a first region of the transients in the extended buffer data;
wherein the extended buffer data in the real-time data stream is received at the host with a second region of transients in the extended buffer data; and wherein to form the output data stream, the host does not include the first region of transients and the second region of transients.

5. The method of claim 3, wherein to form the output stream, the host utilizes an interpolation process to form at least a portion of the output data stream.

6. The method of claim 3,
wherein the buffered data stream is processed by a processing device of the host over a first time;
wherein the real-time data stream is processed by the processing device of the host over a second time, and
wherein the processing device of the host is operated such that the second time is shorter than the first time.

7. The method of claim 1, wherein the multiplexed data stream is in a pulse density modulated (PDM) data format.

8. A system, the system comprising:
a microphone configured to;
detect voice activity in a data stream while simultaneously buffering audio data from the data stream in a buffer;
send a signal to the host indicating a positive detection of voice activity in the data stream;
in response to receiving an external clock signal from a host, synchronize internal operations of the microphone with the external clock signal;
send the data stream through a first path, the first path including the buffer and having a buffer delay time corresponding to a time the data stream takes to move through the buffer;
stop sending a buffered data stream after the buffer delay time plus a predetermined buffer extension time, wherein the buffered data stream includes buffered data extending over the buffer delay time and extended buffer data extending over the predetermined buffer extension time;
continuously send the data stream through a second path as a real-time data stream, wherein the second path does not include the buffer, and wherein the real-time data stream begins with the extended buffer data;
multiplex the buffered data stream and the real-time stream to create a multiplexed data stream; and
transmit the multiplexed data stream to the host via a single data line;
wherein the host is coupled to the microphone.

9. The system of claim 8, wherein the multiplexed data stream includes the buffered data and the real-time data during a first operational state, the extended buffered data and the real-time data during a second operational state, and only the real-time data during a third operational state.

10. The system of claim 8, wherein the host is configured to:
receive the multiplexed data stream;
during a second operational state, compare the extended buffer data of the buffered data stream to the extended buffer data of the real-time data stream;
based upon the comparing, determine optimal extended buffer data; and
combine the buffered data stream to the real-time data stream to form an output data stream.

11. The system of claim 10,
wherein the extended buffer data in the buffered data stream is received at the host with a first region of transients in the extended buffer data;
wherein the extended buffer data in the real-time data stream is received at the host with a second region of transients in the extended buffer data; and wherein to form the output data stream, the host does not include the first region of transients and the second region of transients.

12. The system of claim 10, wherein to form the output stream, the host utilizes an interpolation process to form at least a portion of the output data stream.

13. The system of claim 10:
wherein the buffered data stream is processed by a processing device of the host over a first time;
wherein the real-time data stream is processed by the processing device of the host over a second time, and
wherein the processing device of the host is operated such that the second time is shorter than the first time.

14. The system of claim 8, wherein the multiplexed data stream is in a pulse density modulated (PDM) data format.

* * * * *